Sept. 26, 1961  A. P. KYLE  3,001,586
BLAST ACTUATED NOZZLE
Filed Feb. 24, 1960
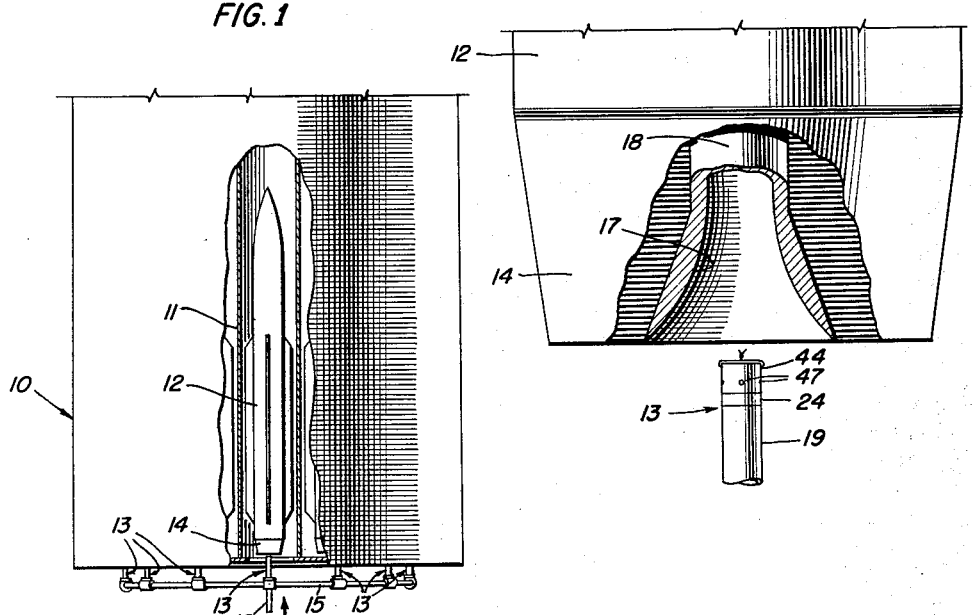
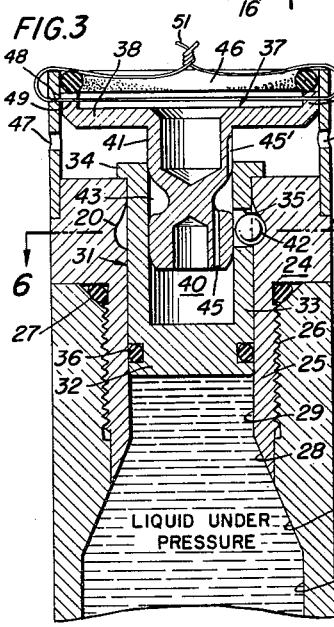
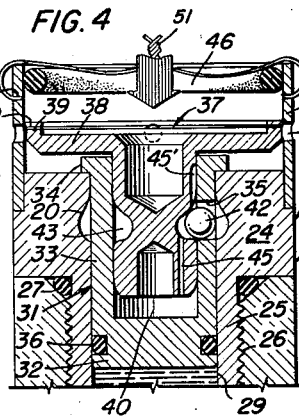
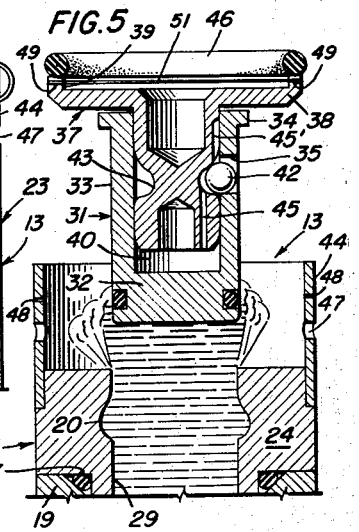
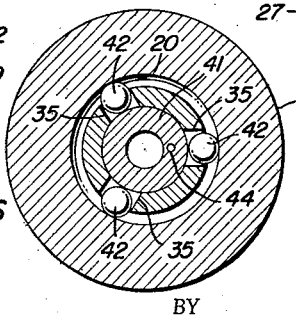
INVENTOR
Adlai P. Kyle
BY  Q. Baxter Warner
Claude Funkhouser
ATTORNEYS

United States Patent Office 3,001,586
Patented Sept. 26, 1961

3,001,586
BLAST ACTUATED NOZZLE
Adlai P. Kyle, Box 79, Dahlgren, Va.
Filed Feb. 24, 1960, Ser. No. 10,816
11 Claims. (Cl. 169—2)
(Granted under Title 35, U.S. Code (1952), sec. 266)

The invention described herein may be manufactured and used by or for the Government of the United States of America for governmental purposes without the payment of any royalties theron or therefor.

The present invention relates to fire detectors and automatic fire extinguishers and more particularly to a pressure responsive fire detector and a pressure responsive quenching fluid release mechanism.

The device of the present invention is particularly adapted for use wherever fire protection is desired for an area that is susceptible to blasts and fire hazards such, for example, as, in a structure or compartment containing ammunition, propellants or explosives, as the case may be. One particular application of the device relates to the problem of rocket safety in a conventional magazine loaded with booster rockets. It is to be understood that the present invention offers protection in the event of accidental or inadvertent ignition of one of the stored rockets by releasing a quenching fluid to extinguish the rocket propellant or motor substantially upon ignition thereof.

Briefly, the present invention contemplates the provision of a nozzle connected to a suitable supply line and having a sealing or slug member releasably locked to the nozzle by a plurality of locking balls, the slug being in sealing engagement with the nozzle, whereupon fluid under pressure is maintained therein. The balls are maintained in locking engagement with the nozzle by an actuating piston operated in response to a blast or shock wave generated upon ignition of the rocket propellant. Movement of the actuating piston by the blast unlocks the slug from the nozzle and locks the slug to the actuating piston. In the aforesaid position of the slug and piston the fluid within the nozzle acting on the slug forcibly ejects the slug and piston from the nozzle, whereupon the fluid is released from the nozzle and directed on the propellant.

An object of the present invention is to provide a new and improved quenching device.

Another object of the invention is to provide a fluid discharge nozzle for releasing a quenching fluid in the event of accidental or inadvertent ignition of an article.

Still another object of the invention is to provide a normally sealed and locked fluid discharge nozzle unlocked in response to a sudden blast in one direction and unsealed in response to a predetermined fluid pressure in the reverse direction.

Other objects and many of the attendant advantages of this invention will be readily appreciated as the same becomes better understood by reference to the following detailed description when considered in connection with the accompanying drawings wherein:

FIG. 1 is a view partially in elevation and partially in section of a conventional rocket magazine illustrating the present invention in connection therewith and a rocket disposed in one of the storage tubes of the magazine;

FIG. 2 is a fragmentary view of the nozzle end of the rocket partially in elevation and partially in section illustrating a fragmentary portion of the present invention in connection therewith;

FIG. 3 is an enlarged fragmentary longitudinal sectional view of the blast actuated nozzle of the present invention;

FIG. 4 is a view similar to FIG. 3 illustrating the nozzle in an unlocked condition;

FIG. 5 is a view similar to FIG. 4 illustrating the nozzle in an unsealed condition; and FIG. 6 is a transverse sectional view taken on the line 6—6 of FIG 3.

Referring now to the drawing and more particularly to FIG. 1 thereof, there is shown a conventional magazine 10 which is provided with a plurality of compartments or cells, one of which is shown at 11 and in each of which is stored a rocket 12. It will be noted, FIG. 1, that the nozzle of the present invention generally indicated by the numeral 13 is disposed beneath the rocket 12 and in proximate relation with respect to the trailing end 14 thereof. It will be understood and as clearly shown that the nozzles are disposed beneath each cell and connected to a manifold 15 having a supply line 16 whereby fluid under pressure is supplied to the nozzles 13.

As shown in FIG. 2 the nozzle 13 is disposed adjacent the conventional rocket nozzle 17 which constitutes the trailing end of the rocket motor 18 provided with the usual grain propellant (not shown), the nozzle 13 being disposed along the longitudinal center line of the rocket nozzle 17 so that upon actuation thereof the quenching fluid or solution may be sprayed upon the propellant.

The nozzle 13, as best shown in FIG. 3, comprises a tubular casing or body 19 having a centrally disposed bore 21 tapered as at 22. A nipple generally indicated by the reference character 23 is disposed on the end of casing 19 and comprises a head 24 having a tubular member 25 carried thereby and in threaded engagement with the casing 19 as at 26. A sealing gasket 27 is disposed between the head 24 and the upper end of casing 19 to provide a watertight seal therebetween the head being provided with an annular cam groove 20. The lower end of tubular member 25 of nipple 23 is tapered as at 28 to coincide with the tapered portion 22 of bore 21, the nipple being provided with a centrally disposed bore 29 extending therethrough.

A closure piston or slug generally indicated by the reference character 31 is disposed within the bore 29 provided in member 23 and comprises an end wall 32 having a sleeve portion 33 integrally formed therewith and extending therefrom. The sleeve portion 33 is provided with a flange 34 normally in engagement with the upper surface of head 24 and having a plurality of ball receiving openings 35 formed therein and extending therethrough, FIGS. 3, 4 and 5, the end wall 32 being provided with a sealing gasket 36 such, for example, as an O-ring, in sealing engagement with the wall defining the bore 29.

A blast responsive element or actuating piston generally indicated by the reference numeral 37 is mounted at the discharge end of the nozzle 13 and comprises an enlarged disc or blast receiving member 38 having an annular flange 39 and a ball retaining member or element 41 integrally formed with the disc and extending therefrom for retaining the locking balls 42 within the openings 35 in the sleeve portion 33 and within groove 20 in the head 24, whereupon the closure piston is locked to the nozzle. The member 41 is movably disposed within a bore 40 formed in member 31 and having an annular groove 43 movable into registration with balls 42 as the piston 37 is actuated, the member 41 being provided with passageways 45 and 45' for relieving the pressure within bore 40, as member 41 moves therein.

An annular protector sleeve 44 is secured to the head 24, the sleeve providing protection for the disc 38 and also as a guide during movement thereof. It will be noted, FIG. 3, that a gasket 46 is disposed within the sleeve in sealing engagement therewith for maintaining a watertight connection therebetween, the sleeve being provided with a plurality of openings 47 for relieving the pressure as the disc 38 moves within the sleeve. The sleeve 44 is further provided with a pair of oppositely disposed openings 48 in registration with openings 49 formed in flange 39 for receiving a safety wire or pin 51 to prevent accidental displacement of the actuating piston 37. The wire 51 is composed of any frangible material suitable for the purpose, such for example, as spring steel, or the like, the wire being sheared by the element 37, as the element is actuated to the release position.

It will be apparent that when the device is in a position as shown on FIG. 3, the closure piston 31 is in sealing engagement with the wall defining bore 29 by reason of gasket 36, the piston 31 also being locked to the member 23 by reason of the balls 42 and the ball retaining member 41 on the disc 38. Thus by this arrangement fluid under pressure in the neighborhood of 200 p.s.i. is maintained within the nozzle 13 until the actuating piston 37 is actuated. Upon accidental or inadvertent ignition of a rocket stored in the cell of the magazine, the blast or shock wave therefrom is directed against the disc 38 of the actuating piston 37 and moves the piston 37 to a position, as shown in FIG. 4. When this occurs the balls 42 move from cam groove 20 in head 24 into openings 35 in sleeve portion 33 of closure member 31 and into groove 43 in ball retaining member 41 of the actuating piston 37 thereby unlocking the closure member from the head and providing a locking connection between the closure member and the actuating piston. Upon release of the closure member and as the locking connection between the closure member and the actuating piston occurs, the closure member and actuating piston is forcibly ejected from the discharge end of the nozzle 13 by the pressure of the fluid contained therein, whereupon the nozzle is unsealed to permit a stream of fluid to quickly quench the source of the blast that has triggered the blast actuated nozzle.

Although the device of the present invention has been described in connection with rockets it is to be understood that the device may be employed wherever fire protection is desired such, for example, as an area that is susceptible to blast and fire hazards.

Obviously many modifications and variations of the present invention are possible in the light of the above teachings. It is therefore to be understood that within the scope of the appended claims the invention may be practiced otherwise than as specifically described.

What is claimed is:

1. A fluid discharge device comprising a tubular casing having fluid under pressure contained therein, a discharge nozzle on one end of the casing, a sealing plug for said nozzle and releasably locked thereto, means including a plurality of locking elements for releasably locking said sealing plug to the nozzle, a shock wave responsive device in sealing engagement with said nozzle and movably mounted in said plug in engagement with said locking elements for maintaining said sealing plug locked to said nozzle, and a frangible safety wire carried by said nozzle in engagement with the shock wave responsive device for preventing accidental displacement of the device and release of said sealing plug, said responsive device being movable out of engagement with said locking elements to unlock the sealing plug from the nozzle as the responsive device is actuated by a shock wave and said frangible wire is severed in response to movement thereof, whereupon said sealing plug and responsive device is forcibly ejected from the nozzle by said fluid under pressure to allow the discharge of the fluid from the nozzle.

2. A fluid discharge nozzle comprising a tubular casing having a quantity of fluid under pressure therein, a pressure responsive member disposed within one end of the casing in sealing engagement therewith and releasably locked to the casing for maintaining said fluid therein, means including a plurality of locking balls normally in engagement with said casing for releasably locking said member to the casing, a blast responsive device normally sealed to said casing and in engagement with the locking balls and movable from an initial position to a ball releasing position for maintaining said locking balls in locking engagement with the casing, means on the blast responsive device for allowing the locking balls to move out of engagement with the casing to release said member as the blast responsive device is actuated from an initial position to said release position in response to a sudden blast applied thereto, and a frangible wire carried by the casing in engagement with said blast responsive device for preventing accidental displacement of the device and release of said member until the device is actuated from an initial position to a release position, said pressure responsive member and blast responsive device being forcibly ejected from the casing by said fluid pressure within the casing acting on the pressure responsive member as the member is released thereby to discharge the fluid from the casing.

3. In a fire fighting system, the combination of a rocket including a propellant, a supply line and water under pressure in the supply line, a nozzle connected to the supply line and having a discharge opening, sealing means disposed within said opening and releasably locked to said nozzle, a shock responsive element in sealing engagement with the nozzle and close proximity with the propellant for normally maintaining said sealing means locked to the nozzle and for unlocking the sealing means therefrom as said shock responsive element is actuated by a sudden shock wave produced upon ignition of the propellant, said sealing means and shock responsive element being forcibly blown from the nozzle by said fluid under pressure as the sealing means is unlocked from the nozzle to unseal the discharge opening thereby to allow the fluid to flow therethrough, and means for maintaining said element locked to said nozzle until the element is actuated by said sudden shock wave.

4. In a fire fighting system, the combination of a rocket including a propellant, a manifold and a source of supply for supplying fluid under pressure to the manifold, a nozzle connected to the manifold and having a discharge opening, a sealing member disposed within said opening and releasably locked to said nozzle, locking means carried by said sealing member for releasably locking the sealing member to the nozzle, a shock sensing element in sealing engagement with said nozzle and subjacent the propellant in engagement with said locking means for maintaining the sealing member locked to said nozzle and movable out of engagement with the locking means to unlock the sealing member from the nozzle as the shock sensing element is actuated by a shock wave produced upon ignition of the propellant, said sealing member and shock sensing element being forcibly blown from the nozzle by said fluid under pressure as the sealing member is unlocked from the nozzle thereby to allow the fluid to flow through discharge opening, and means for maintaining the shock sensing element locked to said nozzle until the element is actuated by said shock wave.

5. The combination as recited in claim 4 wherein said locking means includes a plurality of locking balls carried by the sealing member, and an annular groove provided in said nozzle for receiving the locking balls.

6. The combination as recited in claim 4 wherein said sensing element includes a shock wave receiving disc, and a retaining element carried by said disc for retaining the locking means in a locking position until the shock sensing element is actuated.

7. The combination as recited in claim 4 wherein said shock sensing element includes an annular groove for receiving the locking means to unlock the sealing member from the sensing element upon actuation of the sensing element by the shock wave.

8. The combination as recited in claim 4 wherein said locking means includes a plurality of openings provided in the sensing element, a locking ball disposed in each one of said plurality of openings, an annular groove in said nozzle for receiving the locking balls when the sensing element is in an initial position, and an annular groove in the sensing element for receiving the locking ball when the sensing element is actuated by the shock wave.

9. A fluid discharge nozzle comprising a tubular casing having fluid under pressure contained therein, means in sealing engagement with the casing and releasably locked thereto for maintaining the fluid within the casing, locking means carried by said fluid maintaining means in locking engagement with said casing for releasably locking the maintaining means to the casing, a blast responsive device disposed within said casing in sealing engagement therewith and normally in engagement with said locking means for unlocking said fluid maintaining means from the casing as the blast responsive device is actuated in response to a sudden blast applied thereto thereby to release the fluid from the casing, and a frangible wire carried by the casing and attached to the blast responsive device for preventing accidental displacement of the blast responsive device and unlocking of the fluid maintaining means until said sudden blast is applied to the blast responsive device.

10. A blast actuated nozzle comprising a tubular casing having an internal fluid pressure contained therein, sealing means disposed within the casing in sealing engagement therewith and releasably locked thereto, said sealing means being actuated by the internal fluid pressure to unseal the casing as the sealing means is unlocked therefrom, locking means carried by said sealing means in engagement with the casing for releasably locking the sealing means thereto, a blast responsive element in sealing engagement with the casing and normally in engagement with the locking means for unlocking the sealing means from the casing as the element is actuated by a sudden external blast, and a frangible wire carried by said casing and attached to said blast responsive element for preventing accidental displacement of the element and unlocking of the sealing means until the blast responsive element is actuated, said sealing means and blast responsive element being forcibly ejected from the casing by the internal pressure as the frangible means is severed and the sealing means is unlocked therefrom thereby to release the internal fluid pressure.

11. In a fluid discharge device, a discharge nozzle, a pressure responsive element in sealing engagement with said nozzle for maintaining fluid under pressure therein, means including a plurality of locking balls carried by said pressure responsive element for releasably locking said pressure responsive element to the nozzle, a shock wave responsive member in sealing engagement with the nozzle, retaining means on said shock wave responsive member and normally in engagement with said locking balls for releasing the pressure responsive element as said shock wave responsive member is actuated by a sudden shock wave, whereupon said element and member are forcibly ejected from the nozzle by the fluid pressure therein, and a frangible wire carried by said nozzle and attached to the shock wave responsive member for preventing accidental displacement of the member and release of the element until the member is actuated by said sudden shock wave an amount sufficient to move said retaining means out of engagement with the locking balls.

References Cited in the file of this patent

UNITED STATES PATENTS

| | | |
|---|---|---|
| 1,715,504 | Johnston et al. | June 4, 1929 |
| 2,355,185 | Thomsen | Mar. 19, 1941 |
| 2,580,448 | Mapes et al. | Jan. 1, 1952 |
| 2,692,112 | Szitar | Oct. 19, 1954 |
| 2,736,386 | Klompar | Feb. 28, 1956 |
| 2,918,976 | Peterson | Dec. 29, 1959 |